(12) United States Patent
Mills et al.

(10) Patent No.: US 6,958,683 B2
(45) Date of Patent: Oct. 25, 2005

(54) MULTIPURPOSE VISION SENSOR SYSTEM

(75) Inventors: Aaron L. Mills, Ann Arbor, MI (US);
Gerald H. Engelman, Plymouth, MI (US); Liwen Xu, Southfield, MI (US);
Samir Mohamad Beydoun, Dearborn Heights, MI (US)

(73) Assignee: Ford Motor Company, Dearborn, MI (US)

(*) Notice: Subject to any disclaimer, the term of this patent is extended or adjusted under 35 U.S.C. 154(b) by 20 days.

(21) Appl. No.: 10/605,487

(22) Filed: Oct. 2, 2003

(65) Prior Publication Data

US 2005/0073396 A1 Apr. 7, 2005

(51) Int. Cl.$^7$ ................................................ B60Q 1/00
(52) U.S. Cl. .................. 340/436; 340/435; 340/438; 340/467; 340/901; 340/903; 701/45
(58) Field of Search ................................ 340/436, 435, 340/901, 903, 905, 467; 382/103, 106, 107, 382/174; 701/301, 302, 45, 23

(56) References Cited

U.S. PATENT DOCUMENTS

| | | | |
|---|---|---|---|
| 5,642,238 A * | 6/1997 | Sala | 359/871 |
| 5,699,448 A | 12/1997 | Gorenflo et al. | |
| 6,151,065 A * | 11/2000 | Steed et al. | 348/148 |
| 6,198,998 B1 | 3/2001 | Farmer et al. | |
| 6,411,202 B1 * | 6/2002 | Gal et al. | 340/425.5 |
| 2002/0024713 A1 | 2/2002 | Roberts et al. | |

* cited by examiner

Primary Examiner—Hung Nguyen
(74) Attorney, Agent, or Firm—Frank A. MacKenzie; Artz & Artz

(57) ABSTRACT

A multipurpose sensing system (10) for a vehicle (12) includes an optic (14) that is directed at multiple viewing areas (18). A vision sensor (16) is coupled to the optic (14) and generates multiple object detection signals corresponding to the viewing areas (18). A controller (22) is coupled to the vision sensor (16) and generates multiple safety system signals in response to the object detection signals.

20 Claims, 2 Drawing Sheets

MULTIPURPOSE VISION SENSOR SYSTEM

BACKGROUND OF INVENTION

The present invention relates to vehicle sensing systems. More particularly, the present invention relates to a method and system for performing multiple sensing system operations utilizing a single vision sensor.

Various sensing systems currently exist for performing collision warning and countermeasure system operations, such as detection, classification, tracking, and relative distance and velocity estimation of objects within a close proximity of a host vehicle. Sensing systems also exist for performing other sensing system operations, such as windshield wiper and defogger operations, occupant sensing and tracking operations, and adaptive cruise control operations.

Collision warning and countermeasure systems operations include providing a vehicle operator knowledge and awareness of vehicles and objects that are within a close proximity of the host vehicle to prevent colliding with those objects. Countermeasure systems exist in various passive and active forms. Some countermeasure systems are used to aid in prevention of a collision, others are used to aid in the prevention of injury to a vehicle operator.

Certain collision warning and countermeasure systems are able to sense an object within close proximity of the host vehicle and warn the host vehicle operator, such that the operator can take precautionary steps to prevent a collision or injury. Other collision warning and countermeasure systems activate passive or active countermeasures such as airbags, load limiting seatbelts, or brake control whereby the system itself aids in preventing a collision or injury.

Windshield wiper and defogger operations include clearing a windshield to provide a clear view of an environment forward of a vehicle. Moisture sensors exist for detecting mist, rain, or condensation on a vehicle windshield. In response to the amount of moisture sensed within a given area of the windshield, wiper speed may be adjusted and defoggers may be utilized to clear the windshield.

Occupant related operations include detecting occupant characteristics determining which safety system countermeasures to perform and adjusting times and rates of the countermeasures. Example countermeasures that may be enabled are seat belt pretensioners and airbags. Occupant characteristics may include occupant positioning within a seat, occupant size, or other known occupant characteristics.

Adaptive cruise control operations include adjusting a host vehicle traveling speed to maintain a safe operating distance between the host vehicle and a target vehicle. Other similar sensing systems also exist, such as lane departure and lane-keeping systems, which monitor lane markers or roadway lane designating lines and provide warnings when the host vehicle is not maintaining travel within a current operating lane.

The various sensing systems may be ultrasonic, radar, lidar, or vision-based. In order to perform each of the various sensing system tasks many of the stated sensors are distributed throughout the host vehicle. Each of the sensors increases vehicle manufacturing and maintenance costs.

Thus, there exists a need for an improved sensing system that minimizes the number of sensors and related vehicle components, system complexity, and vehicle manufacturing and maintenance costs involved therein.

SUMMARY OF INVENTION

The present invention provides a method and system for performing multiple sensing system tasks or operations. A multipurpose sensing system for a vehicle is provided and includes an optic that is directed at multiple viewing areas. A vision sensor is coupled to the optic and generates multiple object detection signals corresponding to the viewing areas. A controller is coupled to the vision sensor and generates multiple safety system signals in response to the object detection signals.

One of several advantages of the present invention is that it provides a sensing system that is capable of monitoring multiple viewing areas using a single sensor. In so doing, the present invention minimizes the number of sensors needed to perform multiple sensing system operations. The present invention is capable of performing the sensing system operations that are traditionally performed by multiple separate sensing systems using a single sensor.

Another advantage of the present invention is that it utilizes a single controller for operational control of the sensing system. The controller is capable of controlling multiple sensing system operations, thus further minimizing number of components, costs, and weight of a sensing system.

The present invention itself, together with attendant advantages, will be best understood by reference to the following detailed description, taken in conjunction with the accompanying figures.

BRIEF DESCRIPTION OF DRAWINGS

For a more complete understanding of this invention reference should now be made to embodiments illustrated in greater detail in the accompanying figures and described below by way of examples of the invention wherein:

FIG. 3 is a cross-sectional component and viewing area diagram of the bi-focal optic, the vision sensor, and a reflective device in accordance with another embodiment of the present invention; and.

DETAILED DESCRIPTION

Figure 1:
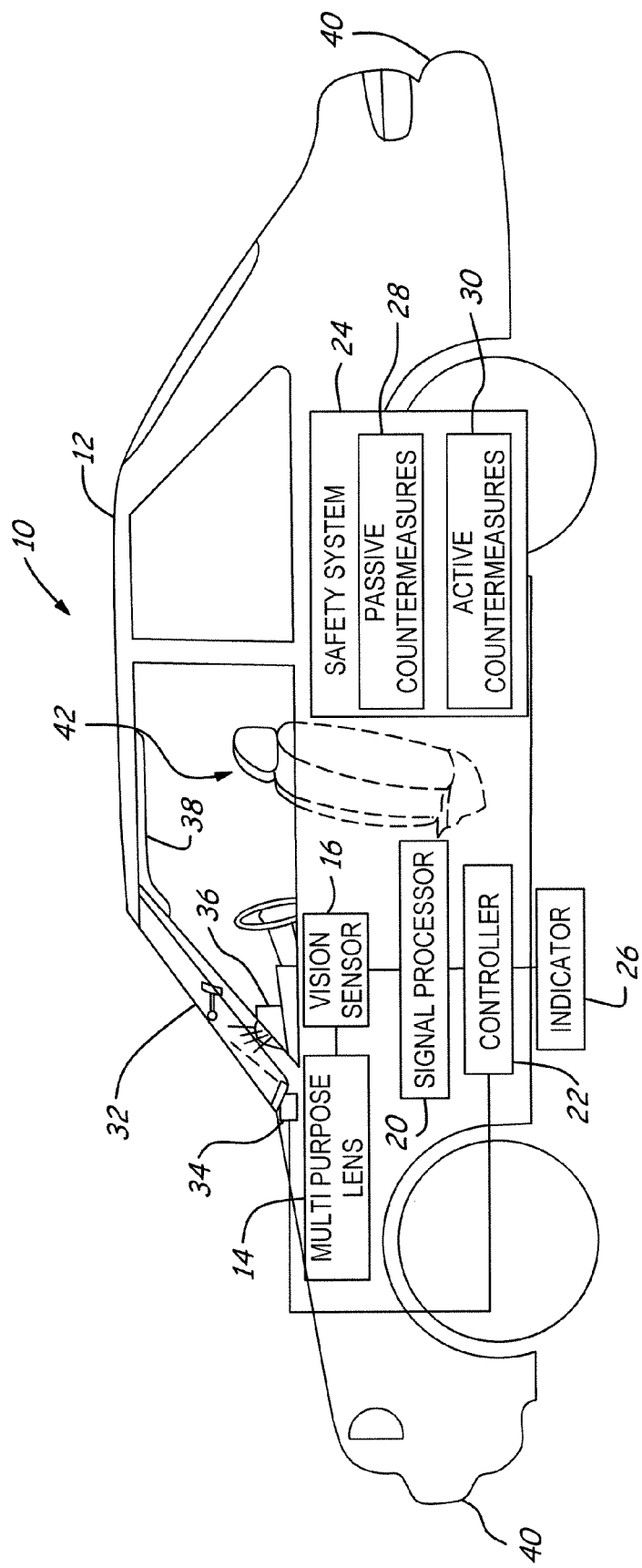
FIG. 1 is a block diagrammatic view of a multipurpose sensing system for a vehicle in accordance with an embodiment of the present invention.

In the following figures the same reference numerals will be used to refer to the same components. The present invention may be adapted and applied to various sensing systems including: collision warning systems, collision avoidance systems, parking-aid systems, reversing-aid systems, passive countermeasure systems, adaptive cruise control systems, lane departure systems, lane-keeping systems, windshield clearing systems, or other systems known in the art.

In the following description, various operating parameters and components are described for multiple constructed embodiments. These specific parameters and components are included as examples and are not meant to be limiting.

Additionally, in the following description, the term "performing" may include activating, deploying, initiating, powering, and other terms known in the art that may describe the manner in which a countermeasure or a comfort and convenience feature may be operated.

As well, in the following description, various countermeasures are discussed. The countermeasures may be reversible or irreversible. Reversible countermeasures refer to countermeasures that may be reset to their original form or used repeatedly without a significant amount of functional deficiency, which may be determined by a system designer. Irreversible countermeasures refer to countermeasures such as airbags that, once deployed, are not reusable.

Furthermore, a countermeasure signal may include information pertaining to the above-stated reversible and irreversible countermeasures or may include other information, such as collision warning information, and parking-aid or reversing-aid countermeasure information. For example, the countermeasure signal may contain object detection information, which may be used to indicate to a vehicle operator the presence or close proximity of a detected object.

In addition, the term "object" may refer to any animate or inanimate object. An object may be a vehicle, a pedestrian, a lane marker, a road sign, a roadway lane designating line, a vehicle occupant, window moisture, or other object known in the art.

Also, although the present invention is primarily described with respect to a single sensor, in applications where a single sensor is infeasible or undesirable additional sensors may be utilized and may be utilized in a similar fashion.

Figure 2:
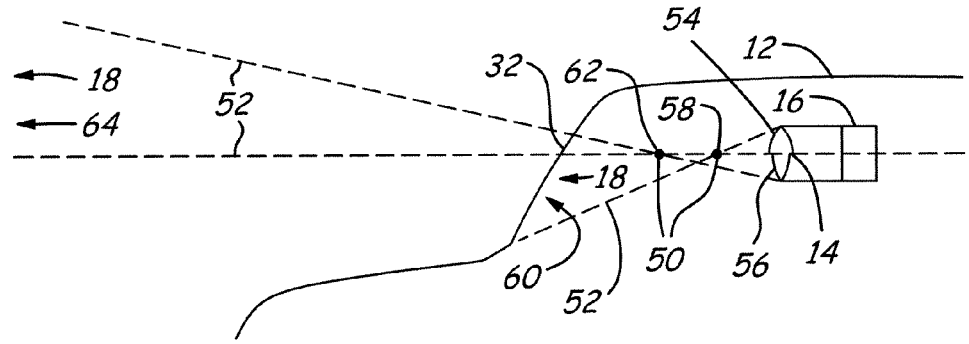
FIG. 2 is a cross-sectional component and viewing area diagram of a bi-focal optic and a vision sensor in accordance with an embodiment of the present invention.
Figure 3:
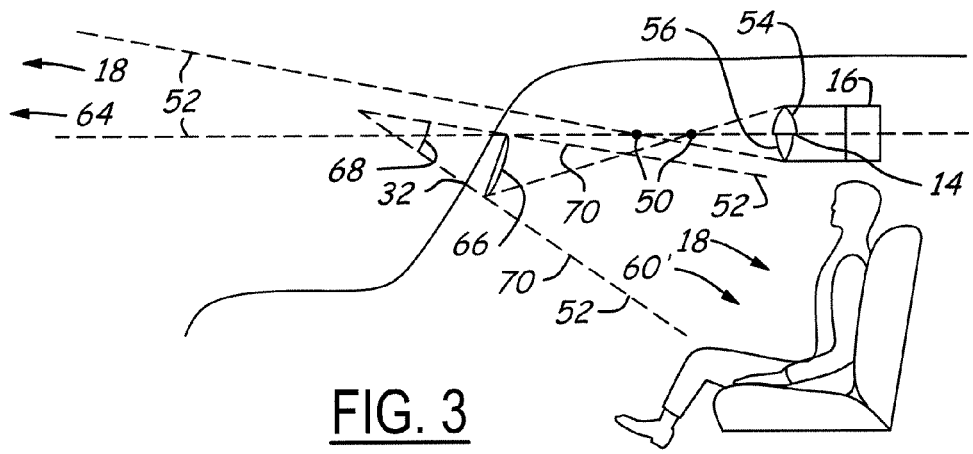

Referring now to FIG. 1, a block diagrammatic view of a multipurpose sensing system 10 for a vehicle 12 in accordance with an embodiment of the present invention is shown. The vision sensing system 10 includes a multi-focal optic 14 coupled to a vision sensor 16. The vision sensor 16 in conjunction with the lens 14 is capable of monitoring multiple viewing areas 18, as are best seen in FIGS. 2 and 3. A signal processor 20 is coupled to the vision sensor 16 and formats object detections signals generated by the vision sensor 16 for further processing by a controller 22. The controller 22 in response to the object detection signals performs various sensing system operations.

A safety system 24 and an indicator 26 are coupled to the controller 22. The controller 22 may enable various passive countermeasures 28 and active countermeasures 30 within the safety system 24 in response to the object detection signals. The controller 22 as part of a countermeasure may generate a warning signal and communicate the warning signal to vehicle occupants via the indicator 26.

The vision sensor 16 may be a camera, a charged-coupled device, an infrared detector, a series of photodiodes, or other vision sensor known in the art. The vision sensor 16 may be located in various locations on the vehicle 12.

The signal processor 20 receives and converts the object detection signals, generated by the vision sensor 16, into a proper format for reception by the controller 22. The signal processor 20 may include analog-to-digital converters, filters, or amplifiers, as well as other signal conditioning components known in the art. The signal processor 20 may be part of the vision sensor 16 or the vehicle controller 22, may be a stand-alone device, as shown, or may be some combination thereof.

The controller 22 may be microprocessor based such as a computer having a central processing unit, memory (RAM and/or ROM), and associated input and output buses. The controller 22 may be an application-specific integrated circuit or be formed of other logic devices known in the art. The controller 22 may be a portion of a central vehicle main control unit, an interactive vehicle dynamics module, a restraints control module, a main safety controller, or may be a stand-alone controller as shown.

The controller 22 may perform various different sensing system operations including adaptive cruise control, lane-keeping control, lane-departure control, window clearing control, collision avoidance control, countermeasure control, or other sensing system operations known in the art. The operations may be performed sequentially or simultaneously.

Adaptive cruise control is used for monitoring objects forward of the vehicle 12 and for maintaining a safe predetermined distance away from the detected objects to prevent collision therewith. When adaptive cruise control is active the controller 22 may warn the vehicle operator of an impending object or perform a countermeasure as to alter the speed of travel of the vehicle 12.

Lane-keeping and lane-departure control refer to when the controller 22 monitors lane markings or roadway lane designating lines and warns the vehicle operator when the vehicle 12 is exiting a current lane of travel or is directed to exit the current lane of travel. The controller 22 may perform a countermeasure to maintain the current lane of travel, such as controlling the vehicle steering to adjust direction of travel of the vehicle 12.

Window clearing control refers to performing tasks to clear a window, thus, providing a clear view of an environment forward of the vehicle 12. The vision sensor 16 in conjunction with the multi-focal optic 14 detects and senses the amount of mist, rain, or condensation on a window of the vehicle 12, such as the windshield 32. In response to the amount of moisture sensed within a given area of the window, the controller 22 may adjust wiper speed of a wiper system 34 or activate or increase flow rate of defoggers within a defogger system 36.

Countermeasure control may include occupant related operations, such as detecting occupant characteristics, determining which of the countermeasures 28 and 30 to perform, and adjusting times and activating rates of the countermeasures 28 and 30. The occupant characteristics may include occupant positioning within a seat, occupant size, or other known occupant characteristics.

The controller 22 determines which of the sensing system operations to perform. The controller 22 while performing one or more of the sensing system operations may determine whether to perform one or more of the countermeasures 28 and 30 and indicate to the vehicle operator various object and vehicle status information. Depending upon relative positions, velocities, and accelerations of the detected objects, the controller 22 may also determine whether to indicate to the vehicle operator of a potential collision or may perform a countermeasure, as needed, so as to prevent a collision, mitigate a potential injury, or prevent the vehicle 12 from traveling outside a current lane of travel.

The safety system 24 may be coupled to the controller 22 and include object detection sensors, such as the vision sensor 16, and the signal processor 20. The safety system 24 may include the countermeasures 28 and 30 as well as other safety system components, systems, or controllers known in the art.

The passive countermeasures 28 may include internal air bag control, seatbelt control, knee bolster control, head restraint control, load limiting pedal control, load limiting steering control, pretensioner control, external air bag control, pedestrian protection control, and other passive countermeasures known in the art.

The active countermeasures 30 may include brake control, throttle control, steering control, suspension control, transmission control, and other vehicle control systems. The controller 22 may signal the vehicle operator via the indicator 26 of an impending potential collision so that the vehicle operator may actively perform a precautionary action, such as applying the brakes or steering to prevent a collision.

The indicator 26 is used to signal or indicate a safety system signal, which may include a warning signal, a collision-warning signal, a countermeasure signal, or an object identification signal in response to the object detection signals. The indicator 26 may include a video system, an audio system, an LED, a light, a global positioning system, a heads-up display, a headlight, a taillight, a display system, a telematic system, or other indicator known in the art. The indicator 26 may supply warning signals, collision-related information, lane departure and lane-keeping information, external-warning signals to objects or pedestrians located outside of the vehicle 12, or other pre and post collision information.

The multipurpose system 10 may be located in various locations in the vehicle 12. The multipurpose system 10 may be located within an overhead console 38, near any vehicle window 32, near a vehicle bumper 40, internal to or external from a vehicle cabin 42, or in various other locations known in the art.

Referring now to FIGS. 2 and 3, cross-sectional component and viewing area diagrams of the optic 14 and the vision sensor 16 in accordance with multiple embodiments of the present invention are shown. The optic 14 may be directed at any number of viewing areas 18 and have any number of focal points 50. Viewing area boundaries are represented by dashed lines 52. In the embodiments of FIGS. 2 and 3 the optic 14, is a bi-focal optic and has an upper portion 54 and a lower portion 56. The upper portion 54 has a first focal point 58 and corresponds to a first viewing area 60, with respect to the embodiment of FIG. 2, and to a first viewing area 60", with respect to the embodiment of FIG. 3. The lower portion 56 has a second focal point 62 and corresponds to a second viewing area 64. The first viewing area 60 is utilized to monitor moisture levels on a vehicle window 32. The first viewing area 60" is utilized to monitor vehicle occupant characteristics. The second viewing area 64 is utilized to monitor objects external to and in a close proximity with the vehicle 12.

In the embodiment of FIG. 3, the first viewing area 60" corresponds with the viewing angle of a reflective device 66. The lower portion 56 is directed at the reflective device 66. The viewing area 60" has a viewing boundary represented by dashed lines 70, which may vary depending upon the application, type of reflective device, mounting locations and relative arrangements of sensing system components, and other viewing angle factors known in the art. In an embodiment of the present invention, the viewing angle 68 is large enough to cover both driver and passenger seating areas of the vehicle 12.

The reflective device 66 may be a wide-angle mirror, as shown, or other reflective device known in the art. The reflective device 66 may be formed of various materials and may be of various sizes, styles, and shapes.

The embodiments of FIGS. 2 and 3 are shown for illustrative example only. Although the present invention is described with respect to a single multi-focal optic, and more specifically to a bi-focal optic, any number of optics or lenses may be utilized. The optics and lenses may be of various size, shape, and style and have any number of associated focal points. As is known in the art, costs of optics and lenses are inexpensive relative to costs of vision sensors.

Figure 4:
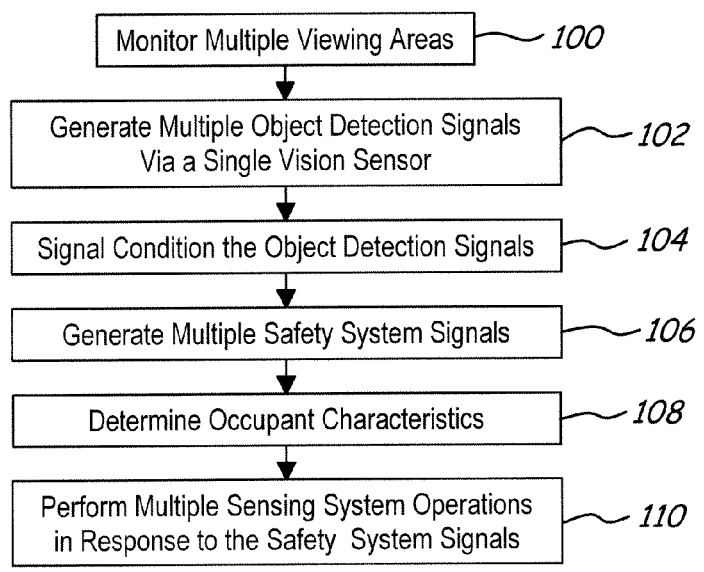
FIG. 4 is a logic flow diagram illustrating a method of performing multiple sensing system operations within a vehicle in accordance with an embodiment of the present invention.

Referring now to FIG. 4, a logic flow diagram illustrating a method of performing multiple sensing system operations within the vehicle 12 in accordance with an embodiment of the present invention is shown.

In step 100, the vision sensor 16 in conjunction with the optic 14 and the reflective device 66, when used, monitors the viewing areas 18. As stated above, the viewing areas 18 may be external, on, or internal to the vehicle 12.

In step 102, the vision sensor 16 generates multiple object detection signals corresponding to the monitored viewing areas 18. Object detection signals may be continuously generated to inform the controller 22 of object status external to, on, and internal to the vehicle 12. When the reflective device 66 is utilized one or more object detection signals are generated corresponding to the viewing area 60". The object detection signals may be generated sequentially or simultaneously.

In step 104, the signal processor 20 converts, modifies, and formats the object detection signal for reception by the controller 22. The signal processor may, for example, include an analog-to-digital converter to convert analog image signals into a digital format.

In step 106, the controller 22 generates multiple safety system signals in response to the object detection signals. The safety system signals may include not only countermeasures related signals, as stated above, but may also include signals related to other sensing system controls, some of which are also stated above.

In step 108, the controller 22 may determine occupant characteristics in response to the object detection signals. In determining occupant characteristics the controller 22 may also determine whether a child safety seat is located within a vehicle seat of the viewing area 60". Step 108 may be performed simultaneously with step 106, whereby, the controller 22 generates or modifies safety system signals in response to the determined occupant characteristics.

In step 110, the controller 22 may perform multiple sensing system operations in response to the safety system signals. The controller 22 may perform a countermeasure operation, a windshield clearing operation, an adaptive cruise control operation, or any of the other above-mentioned or known in the art sensing system operation in response to the safety system signals. For example, the vision sensor 16 may detect a moisture level on the windshield 32 to be above a predetermined level and in response thereto the controller 22 may activate or increase speed of the wiper system 34. As another example, the vision sensor 16 may detect an occupant that is small in size or a child safety seat within a seat system and decelerate or prevent activation of an air bag near the occupant or safety seat.

The above-described steps are meant to be illustrative examples; the steps may be performed sequentially, synchronously, simultaneously, or in a different order depending upon the application.

The present invention provides a multipurpose sensing system that is capable of monitoring multiple viewing areas using a single vision sensor and controller. The present invention in utilizing a single vision sensor and controller minimizes the number of sensors and sensing system com- While the invention has been described in connection with one or more embodiments, it is to be understood that the specific mechanisms and techniques which have been described are merely illustrative of the principles of the invention, numerous modifications may be made to the methods and apparatus described without departing from the spirit and scope of the invention as defined by the appended claims

What is claimed is:

1. A multipurpose sensing system for a vehicle comprising:
    at least one optic directed at and non-fiber optically monitoring a plurality of separate non-adjacent viewing areas;
    a single vision sensor coupled to said at least one optic and generating a plurality of object detection signals corresponding to said plurality of separate non-adjacent viewing areas; and
    a controller coupled to said vision sensor and generating a plurality of safety system signals in response to said plurality of object detection signals.

2. A system as in claim 1 wherein said vision sensor generates a first object detection signal and a second object detection signal and wherein said controller generates a first safety system signal in response to said first object detection signal and a second safety system signal in response to said second object detection signal.

3. A system as in claim 1 wherein said at least one optic comprises:
    a first focal point that corresponds to objects on the vehicle; and
    a second focal point that corresponds to objects external to the vehicle.

4. A system as in claim 3 wherein said first focal point corresponds to moisture on a vehicle window.

5. A system as in claim 1 wherein said at least one optic comprises:
    a first focal point that corresponds to objects within the vehicle; and
    a second focal point that corresponds to objects external to the vehicle.

6. A system as in claim 5 wherein said first focal point corresponds to vehicle occupants within the vehicle.

7. A system as in claim 1 wherein said vision sensor is selected from a camera, a charged coupled device, an infrared detector, and at least one photodiode.

8. A system as in claim 1 further comprising a signal processor receiving and formatting said plurality of object detection signals for reception by said controller.

9. A system as in claim 1 wherein said vision sensor generates said plurality of object detection signals simultaneously.

10. A system as in claim 1 wherein the system is configured as to be mounted within an overhead console.

11. A system as in claim 1 wherein said controller performs sensing system operations selected from at least one of adaptive cruise control, lane-keeping control, lane-departure control, window clearing control, collision avoidance control, and countermeasure control in response to said plurality of object detection signals.

12. A system as in claim 1 wherein said controller determines occupant characteristics in response to said plurality of object detection signals.

13. A system as in claim 1 wherein said controller determines existence of a child safety seat in response to said plurality of object detection signals.

14. A system as in claim 1 further comprising a reflective device, said vision sensor generating at least one object detection signal in response to at least a portion of a view from said reflective device.

15. A system as in claim 12 wherein said reflective device is a mirror.

16. A method of performing a plurality of sensing system operations within a vehicle comprising:
    monitoring a plurality of separate non-adjacent viewing areas via a non-multi conduit transmission medium;
    generating a plurality of object detection signals from a single vision sensor corresponding to said plurality of separate non-adjacent viewing areas;
    generating a plurality of safety system signals in response to said plurality of object detection signals; and
    performing the plurality of sensing system operations in response to said plurality of safety system signals.

17. A method as in claim 16 wherein monitoring a plurality of separate non-adjacent viewing areas comprises monitoring a first viewing area on the vehicle and a second viewing area external to the vehicle.

18. A method as in claim 16 wherein monitoring a plurality of separate non-adjacent viewing areas comprises monitoring a first viewing area internal to the vehicle and a second viewing area external to the vehicle.

19. A method as in claim 16 wherein generating a plurality of object detection signals comprises generating at least one object detection signal in response to at least a portion of a view from a reflective device.

20. A multipurpose sensing system for a vehicle comprising:
    a multi-focal lens having a first focal point corresponding to a first viewing area and a second focal point corresponding to a second viewing area;
    a reflective device directed at said second viewing area;
    a vision sensor coupled to said multi-focal lens and generating a first object detection signal with respect to said first viewing area and a second object detection signal with respect to said second viewing area as is reflected from said reflective device; and
    a controller coupled to said vision sensor and generating a first safety system signal in response to said first object detection signal and a second safety system signal in response to said second object detection signal.

* * * * *